United States Patent
Hirasawa et al.

(10) Patent No.: US 6,923,372 B2
(45) Date of Patent: Aug. 2, 2005

(54) CARD GATE MECHANISM IN CARD READER

(75) Inventors: Kenji Hirasawa, Nagano (JP); Kazutoshi Ishikawa, Nagano (JP)

(73) Assignee: Kabushiki Kaisha Sankyo Seiko, Nagano (JP)

( * ) Notice: Subject to any disclaimer, the term of this patent is extended or adjusted under 35 U.S.C. 154(b) by 0 days.

(21) Appl. No.: 10/432,185

(22) PCT Filed: Nov. 27, 2001

(86) PCT No.: PCT/JP01/10341
§ 371 (c)(1),
(2), (4) Date: May 20, 2003

(87) PCT Pub. No.: WO02/42990
PCT Pub. Date: May 30, 2002

(65) Prior Publication Data
US 2004/0007620 A1 Jan. 15, 2004

(30) Foreign Application Priority Data
Nov. 27, 2000 (JP) ........................... 2000-360119

(51) Int. Cl.⁷ ............................................. G06G 7/08
(52) U.S. Cl. ........................ 235/449; 235/475; 235/482; 235/483
(58) Field of Search ................ 235/449, 475, 235/382, 482–483; 902/8

(56) References Cited

U.S. PATENT DOCUMENTS

| | | | |
|---|---|---|---|
| 4,756,604 A | 7/1988 | Nakatsuka et al. | |
| 5,635,696 A | * 6/1997 | Dabrowski | 235/449 |
| 5,702,304 A | * 12/1997 | Acres et al. | 463/29 |
| 6,390,372 B1 | * 5/2002 | Waters | 235/487 |
| 6,641,034 B1 | * 11/2003 | Oki et al. | 235/380 |
| 6,685,086 B1 | * 2/2004 | Mackenzie et al. | 235/379 |

FOREIGN PATENT DOCUMENTS

| | | |
|---|---|---|
| DE | 35 31 355 | 3/1987 |
| EP | 35 28 558 | 2/1987 |
| EP | 0 301 480 | 2/1989 |
| EP | 1 024 452 | 8/2000 |
| JP | 53-102687 | 9/1978 |
| JP | 57-203170 | 12/1982 |
| JP | 58-056086 | 4/1983 |
| JP | 59-121682 | 8/1984 |
| JP | 09-223184 | 8/1997 |

* cited by examiner

Primary Examiner—Diane I. Lee
Assistant Examiner—Seung H Lee
(74) Attorney, Agent, or Firm—Notaro&Michalos PC (57) ABSTRACT

A structure of a card gate mechanism in a card reader of, e.g., an ATM (automated teller machine). In order to constitute a gate opening (3) of a card gate mechanism (1), a gate frame (4a, 4b) which includes a wide-open portion (5) which leads a card (2) to a card carrying path (14) by using a material which transmits light is provided on at least one surface side of the card (2), and a light source portion (6) which irradiates the gate frame (4a, 4b) with the light is provided, thereby causing the wide-open portion (5) to shine by emitting the light from the light source portion (6). In this case, when a part of the gate frame (4a, 4b) is formed as a lens portion (9), a direction of light irradiation can be controlled, thereby alleviating irregularities in an element.

12 Claims, 10 Drawing Sheets

CARD GATE MECHANISM IN CARD READER

TECHNICAL FIELD

The present invention relates to a card gate mechanism in a card reader in, e.g., an ATM (automated teller machine). More particularly, the present invention relates to a structure of a gate opening of a card gate mechanism.

BACKGROUND ART

Figure 12:
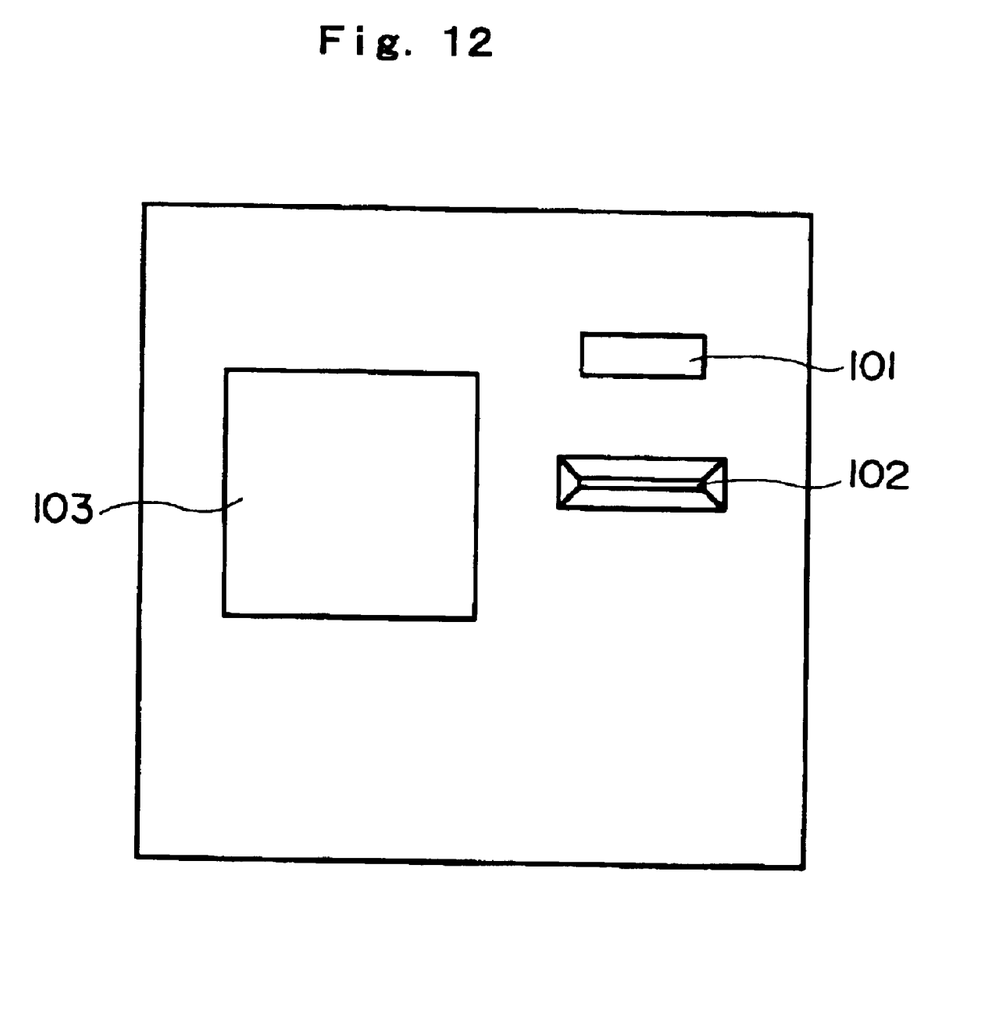
FIG. 12 is a front view showing a conventional card reader.

Conventionally, a light emitting element such as an LED (which will be referred to as a "display LED" hereinafter) which emits light or causes light to flash is mounted to a card reader in, e.g., an ATM in order to urge a user to insert his/her card or clearly indicate an insertion opening. This display LED 101 is provided, e.g., upper or lower on the panel separately from a gate opening (card insertion opening) 102 of a card reader (reference numeral 103 denotes a display) as shown in FIG. 12.

However, in the above-described card reader, the display LED 101 may not be provided at the actual gate opening 102 and users may be bewildered in some cases.

Further, in the above-described card reader, in order to prevent electric parts in the display LED 101 from being short-circuited when getting wet with water or to alleviate irregularities in light emission of individual elements when the light emitting element is, e.g., an LED, a cover, which consists of a transparent or light-transparent material and to which means to diffuse the light is provided, is required as well as the light emitting element, thereby increasing the number of components.

It is, therefore, an object of the present invention to provide a card gate mechanism in a card reader that a gate opening for a card can be readily recognized by a user and the number of components such as a light emitting element can be reduced.

DISCLOSURE OF INVENTION

To achieve this aim, according to the present invention, there is provided a card gate mechanism in a card reader, comprising: a gate frame which is provided on at least one surface side of a card in order to constitute a gate opening and includes an wide-open portion used to lead the card to a card carrying path by using a material which transmits the light therethrough; and a light source portion which irradiates the gate frame with the light, thereby causing the wide-open portion to shine by emitting the light from the light source portion.

According to this card gate mechanism, since the gate opening which is a card insertion opening includes the wide-open portion which leads the card, the card can be readily inserted. Furthermore, since the gate frame including the wide-open portion is formed of a light transparent material and the light is transmitted through the wide-open portion by emitting the light from the inside to the outside, the light leaks from the wide-open portion itself and the wide-open portion looks shining. Therefore, a user can directly recognize the gate opening into which the card is inserted, and he/she is no longer bewildered when he/she uses the card reader.

Moreover, it is preferable that the light source portion of the card gate mechanism in a card reader consists of a circuit board on which a plurality of light emission sources are arranged in a card width direction and that a lens portion constituted by a gate frame is formed between the light emission sources and the wide-open portion in the gate frame. When a part of the gate frame consisting of a light transparent material is formed as a lens portion, a direction of light irradiation can be controlled and irregularities in the element can be alleviated.

In addition, it is preferable that an optical element used to diffuse the light is arranged between the light emission sources and the lens portion of the card gate mechanism in a card reader. The optical element narrows the intervals of light and shade by diffusing the light emitted by the light source portion and reduces irregularities in the irradiated part of the gate opening, thereby uniformizing the light in the gate opening. Therefore, the gate opening can be caused to evenly shine by using the smaller number of light emission sources, and the cost can be decreased by reduction in the number of the light emission sources.

Additionally, it is preferable that the gate frame is constituted by upper and lower frames used to constitute the gate opening and a slit used to attach the circuit board in a direction orthogonal to the card insertion direction is formed to the upper frame. When the gate frame is constituted by two frames, the wide-open portion or the card carrying path can be readily formed between the upper frame and the lower frame, thereby facilitating manufacture of the card gate mechanism. Further, when mounting the circuit board, forming the slit enables insertion of the circuit board from the upper part of the slit, thereby facilitating mounting.

Furthermore, in the card gate mechanism in a card reader, it is preferable that an attachment portion used to attach the circuit board to the upper frame is provided and this attachment portion is formed on the gate opening side away from a magnetic head used to detect insertion of the card. In this case, this attachment portion enables secure mounting of the circuit board inserted into the slit.

Moreover, in the card gate mechanism in a card reader, it is preferable that the optical element has a Fresnel lens shape. In this case, a thickness of the optical element can be reduced, and a size and a weight of the card gate mechanism can be decreased.

In addition, it is preferable that a light leading member which leads the light from the light source portion is provided at the wide-open portion. According to such a light leading member, any position of the wide-open portion can be caused to shine. In this case, since the wide-open portion can be caused to shine by even a single light source portion, the number of members which can be the light emission sources and a size of the device can be reduced.

Additionally, in the card gate mechanism in a card reader, it is preferable that the magnetic head for detecting insertion of a card is provided close to one side of the gate frame in the card width direction, the light source portion is provided close to the opposite side of the magnetic head, and the light leading member is formed in such a manner that a thickness thereof in the card insertion direction becomes thinner toward the magnetic head side from the light source portion. In this case, even if a gap between the magnetic head and the wide-open portion is too narrow to set the light source portion between them, the light leading member can be set between these members, thereby causing the wide-open portion of the gate opening to shine irrespective of existence of the magnetic head.

BEST MODES FOR CARRYING OUT OF THE INVENTION

A structure of the present invention will now be described in detail hereinafter based on best modes.

FIGS. 1 to 4 show a card gate mechanism in a card reader according to the present invention. A card gate mechanism 1 fetches a card 2 inserted from a gate opening 3 of a card reader into the card reader by a non-illustrated carrying mechanism provided inside the card reader. In this embodiment, a gate frame 4 is provided inside the card gate mechanism 1, a light source portion 6 which emits the light from the inside of the gate frame 4 toward the outside is attached to the gate frame 4, thereby causing at least a part of the gate opening 3 to shine. A shining part is indicated by a broken line in the side view of FIG. 1 and others. Further, for better understanding of a passage of the light, the hatching showing the cross section of the gate frame 4 is partially omitted.

The gate frame 4 is a frame constituting the gate opening 3 and the like, and the gate frame 4 is constituted by upper and lower frames 4a and 4b in this embodiment. In this case, the card gate mechanism 1 can be readily manufactured as compared with a integrated frame. For example, a wide-open portion 5 or a card carrying path 14 can be easily formed between the upper frame 4a and the lower frame 4b.

Figure 1:
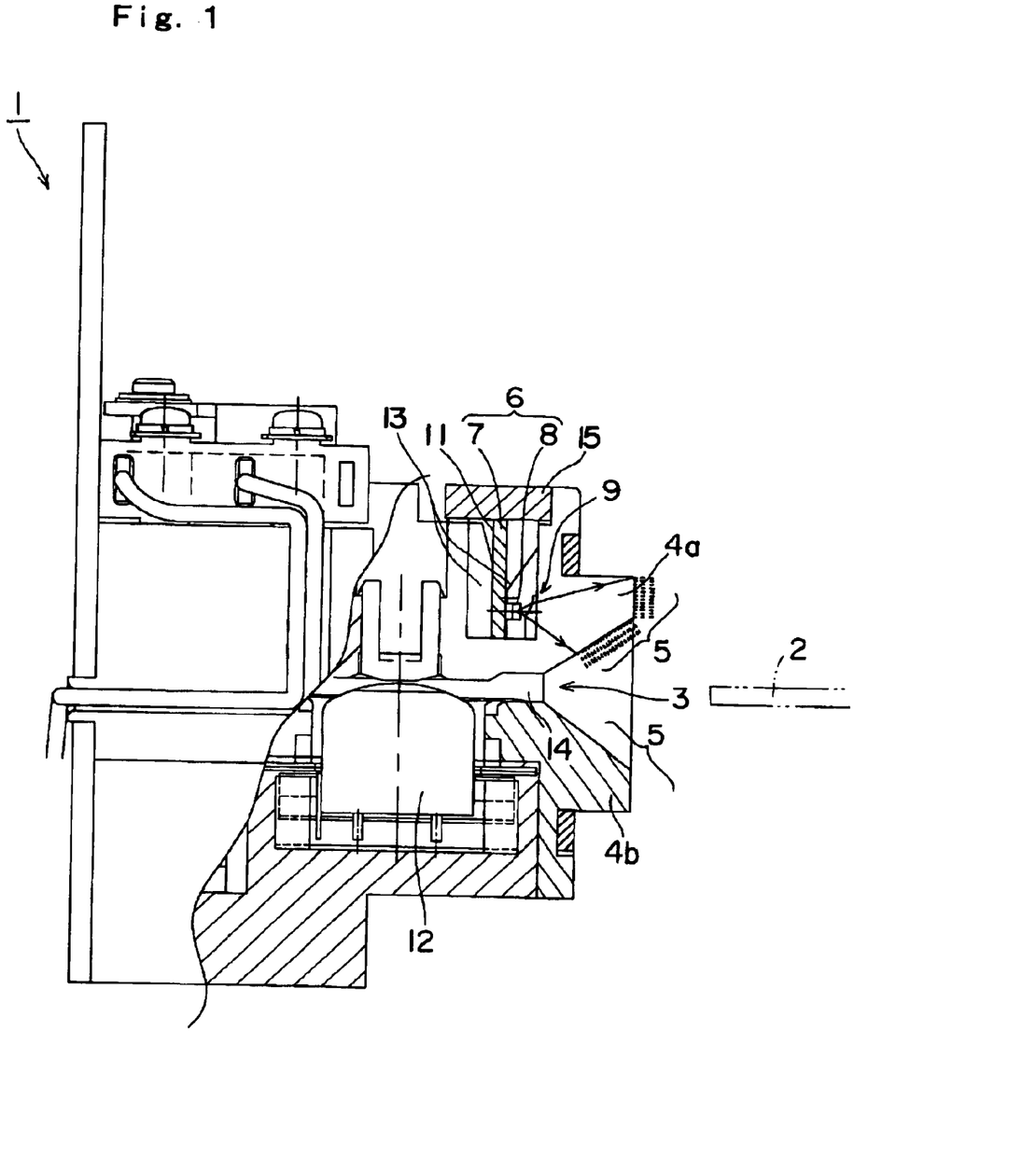
FIG. 1 is a side view showing a partial cross section of a card gate mechanism according to an embodiment of the present invention.
Figure 2:
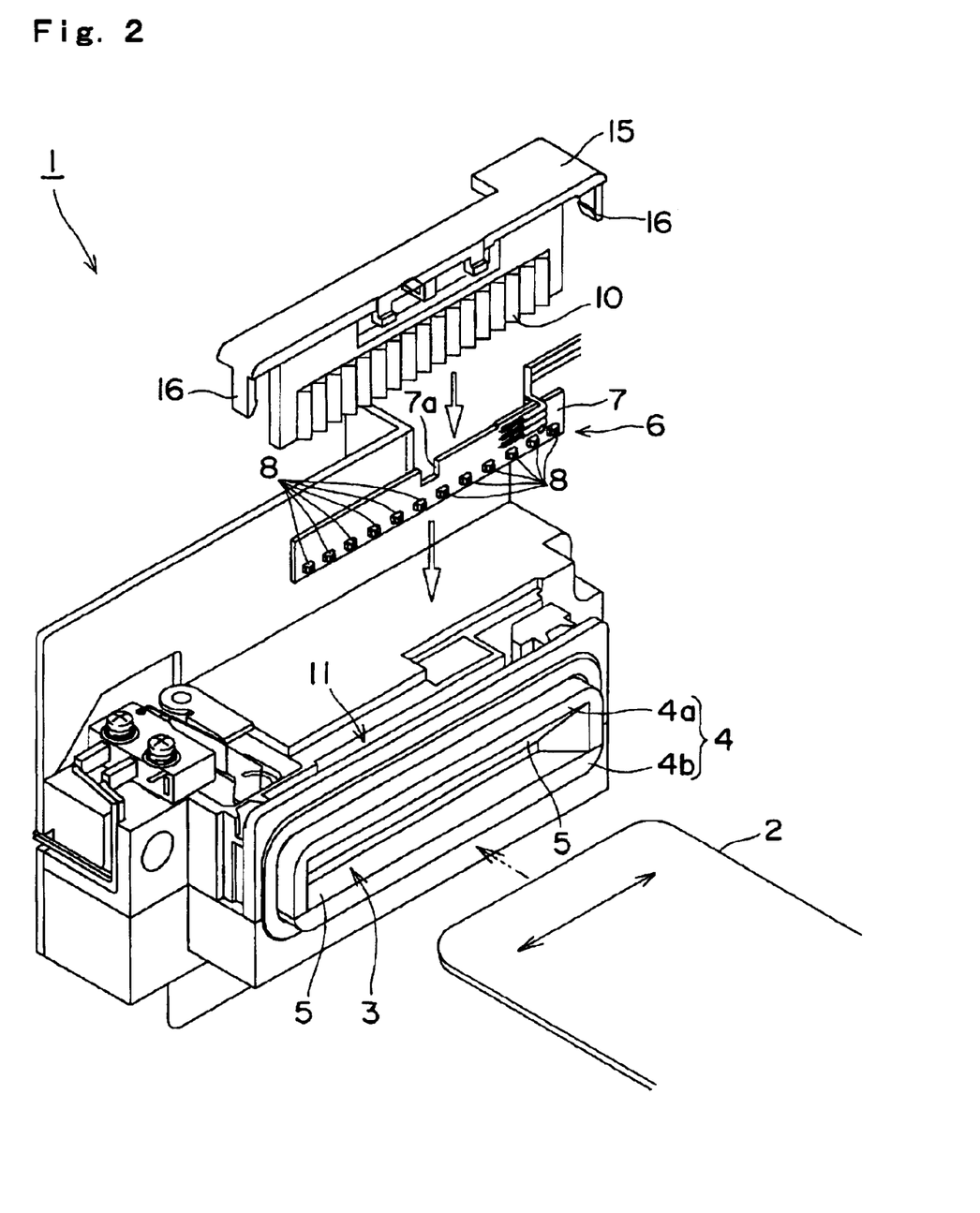
FIG. 2 is a perspective view of the card gate mechanism.

This gate frame 4 includes the wide-open portion 5 which leads the card 2 to the card carrying path 14 and facilitates insertion. As shown in FIG. 2, it is good enough if the wide-open portion 5 has an inclined part on at least one surface side of the card 2 ("one surface of the card 2" means either a front surface or a back surface of the card 2 in this specification) in such a manner that the wide-open portion 5 is wider on the front side of the card reader. In this embodiment, however, the inclined parts are provided on both sides for the front surface and the back surface of the card 2, and the inclined parts are also provided in the card width direction to obtain a funnel shape consisting of the inclined parts on four surfaces, thereby facilitating leading the card 2 to the card carrying path 14. It is to be noted that the card width direction means a direction parallel to one surface of the card 2 and vertical to the card insertion direction.

Furthermore, the gate frame 4 is formed of a material which transmits the light therethrough. As the light transparent material, for example, polycarbonate which is a transparent material and can be readily processed is preferable, but it is not restricted thereto. The gate frame 4 having the light transparency transmits through a predetermined path the light emitted by the light source portion 6 from a predetermined external position of the gate frame 4.

To the predetermined path for the light is formed a lens portion 9 which refracts or reflects a part or all of the light, controls a light irradiation direction, and causes a desired position of the gate opening 3 to shine. This lens portion 9 can be formed by a part of the gate frame 4. For example, when the surface of the gate frame 4 close to the light source portion 6 is roughened by a blast process or the like, the light entering the gate frame 4 can be refracted and a desired area of the wide-open portion 5 can be caused to shine. Furthermore, in FIG. 1, since the lens portion 9 has a concave lens surface, the light can be diffused in the vertical direction. It is to be noted that the processed surface of the gate frame 4 is not restricted to a surface close to the light source portion 6. In the card gate mechanism 1 shown in FIG. 4, the lens portion 9 consisting of a concave surface is formed on the surface of the gate frame 4 that the light which has entered the gate frame 4 reaches, and the incoming light is reflected on this portion so that the light is condensed on the wide-open portion 5 of the gate opening 3, thereby causing the wide-open portion 5 to shine.

The light source portion 6 consists of one or more light emission sources 8 aligned in the card width direction and a circuit board 7 on which these light emission sources 8 are arranged, and emits the light in such a manner that the light is transmitted through the wide-open portion 5 over the entire gate opening 3 in the card width direction and the wide open portion 5 is illuminated. As the light emission source 8, an LED is preferable since it is relatively cheap and has a long duration of life. In this embodiment, a plurality of the light emission sources 8 are arranged on the circuit board 7 in the range which is substantially equal to the card width, and this circuit board 7 is mounted in a slit 11 provided to the gate frame 4.

The slit 11 is a space for the circuit board 7 to be mounted therein, and it is provided to the upper frame 4a so as to accommodate the circuit board 7 in a direction orthogonal to the card insertion direction, i.e., the vertical direction in this embodiment, for example. As a result, in the card gate mechanism 1 according to this embodiment, the circuit board 7 can be inserted from the upper part of the slit 11 in the vertical direction as shown in FIG. 2 and readily mounted. Incidentally, as can be seen from FIG. 2, the circuit board 7 is mounted in the slit 11 of the upper frame 4a in the range substantially equal to the card width.

When the slit 11 is provided in this manner, it is desirable to provide a cover 15 which prevents dust, grim or water-drops from entering the slit 11. The cover 15 can be easily and assuredly attached by, e.g., providing an attachment/detachment claw 16 to the upper frame 4a.

Further, an attachment portion 13 used to attach the circuit board 7 to the upper frame 4a is provided, thereby assuring and simplifying mounting of the circuit board 7. For example, in FIG. 1, the attachment portion 13 is inserted into and attached to the slit 11. Furthermore, as the attachment portion 13, a hook which engages with a central notch 7a of the circuit board 7 may be used. Forming the attachment portion 13 on the gate opening 3 side away from the magnetic head 12 is preferable for reduction in size of the apparatus.

Figure 3:
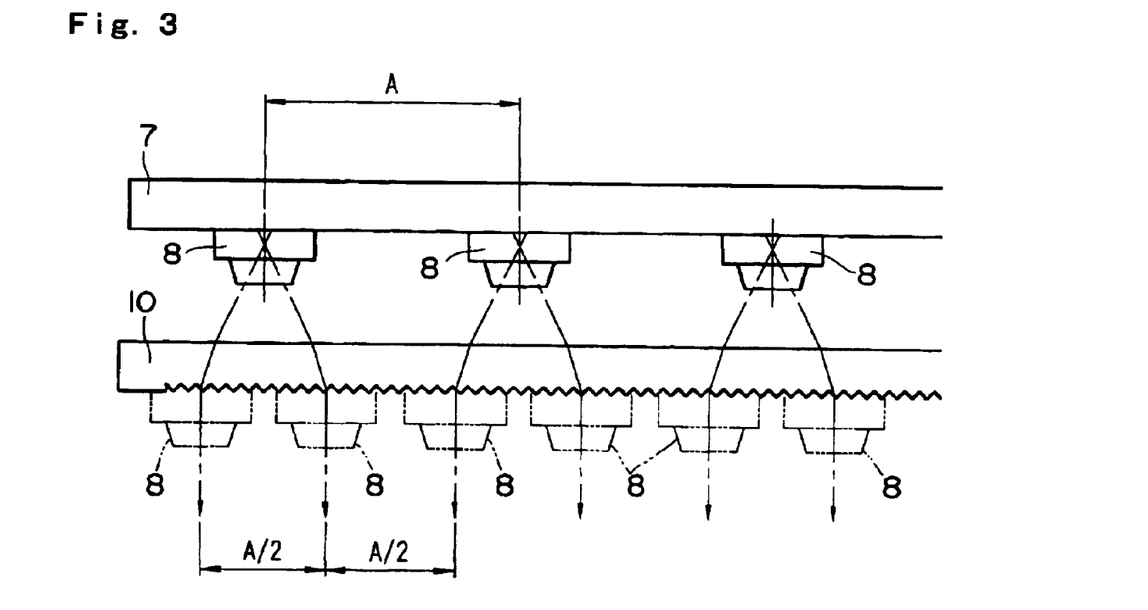
FIG. 3 is a plane view showing a diffusion effect obtained by an optical element.

Moreover, in the present embodiment, it is preferable to arrange the optical element 10 which diffuses the light to the entire wide-open portion 5 between the light emission portions 8 and the lens portion 9. Although this optical element 10 may be provided as a single member, it is integrated with the cover 15 as shown in FIG. 2 in this embodiment, thereby reducing the number of components and facilitating attachment/detachment. In this case, the optical element 10 is formed into, e.g., a concave lens shape which is long in the card width direction like the circuit board 7 and by which the diffused light can be obtained. As the optical element 10, one having a Fresnel lens shape is preferable, which shows as if the number of the light emission sources 8 is doubled, narrows the pitch of lighting from an actual pitch A to a half pitch (A/2), and reduces irregularities in light as shown in FIG. 3. However, a member which reduces the pitch depending on the property of a material itself can be adopted as well as the lens which physically produces the refraction phenomenon of the light. For example, a member consisting of two materials having different refractive indices (e.g., polycarbonate and a glass component mixed therein) can enhance the diffusivity inside and narrow the intervals of light and shade.

On the other hand, a magnetic head 12 used to detect insertion of the card 2 is attached to the lower frame 4b constituting the gate frame 4. The magnetic head 12 used here may be of a type which is well known.

As described above, since the card gate mechanism 1 according to this embodiment causes the gate opening 3, which is the insertion opening for the card 2 and includes the wide-open portion 5, to shine and clearly gives indication of the card insertion opening to a user, the user does not have to guess where the card 2 should be inserted from.

In addition, since a part of the gate frame 4 is determined as the lens portion 9, a direction of light irradiation can be controlled, thereby alleviating irregularities of the element.

Additionally, the card gate mechanism 1 including the optical element 10 narrows the intervals of light and shade by diffusing the light emitted by the light source portion 6, and eliminates irregularities in the irradiated part of the gate opening 3, thereby uniformizing the light on the card insertion opening side. Therefore, the gate opening 3 can be caused to evenly shine by using the reduced number of light emission sources 8, and hence reduction in the number of the light emission sources 8 can lead to a decrease in the cost.

Further, in the card gate mechanism 1 according to this embodiment, since the cover 15 is provided to the slit 11, the circuit board 7 can be protected from dust and the like. Furthermore, since the cover 15 is integrated with the optical element 10, the number of components can be reduced. It is to be noted that the configuration including the gate opening 3 at the gate frame 4 can also lead to reduction in the number of components.

Moreover, since the gate frame 4 is formed of a transparent material in this embodiment, a foreign matter (e.g., a foreign matter pushed into the card carrying path 14) inside the gate opening 3 can be easily discovered as compared with the conventional card reader. Therefore, according to this card gate mechanism 1, a fraudulent act, e.g., fraudulently removing the card 2 can be avoided, thereby strengthening the deterrent.

Figure 4:
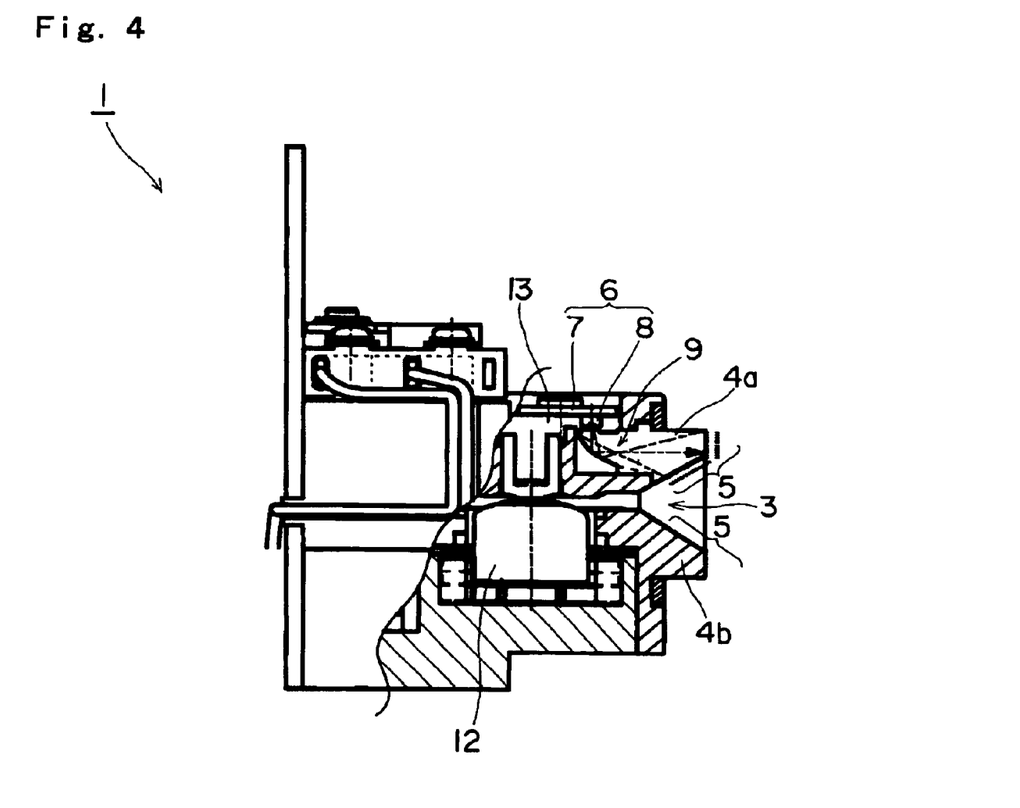
FIG. 4 is a side view showing a card gate mechanism according to another embodiment.

In addition, although the entire gate opening 3 is formed of a light transparent material in the above-described embodiment, the entire gate opening 3 does not always need to have the light transparency, and the same advantage can be obtained by forming at least a part of the gate opening 3 of a light transparent material so as to assure a predetermined path for the light. In this case, only the part of the wide-open portion 5, which is formed of the light transparent material, can transmit the light therethrough. Additionally, when at least a part of the gate opening 3 including the wide-open portion 5 is transparent, the gate opening 3 can be caused to shine by, e.g., reflecting the light by the lens portion 9 having a prism structure as shown in FIG. 4.

Figure 5:
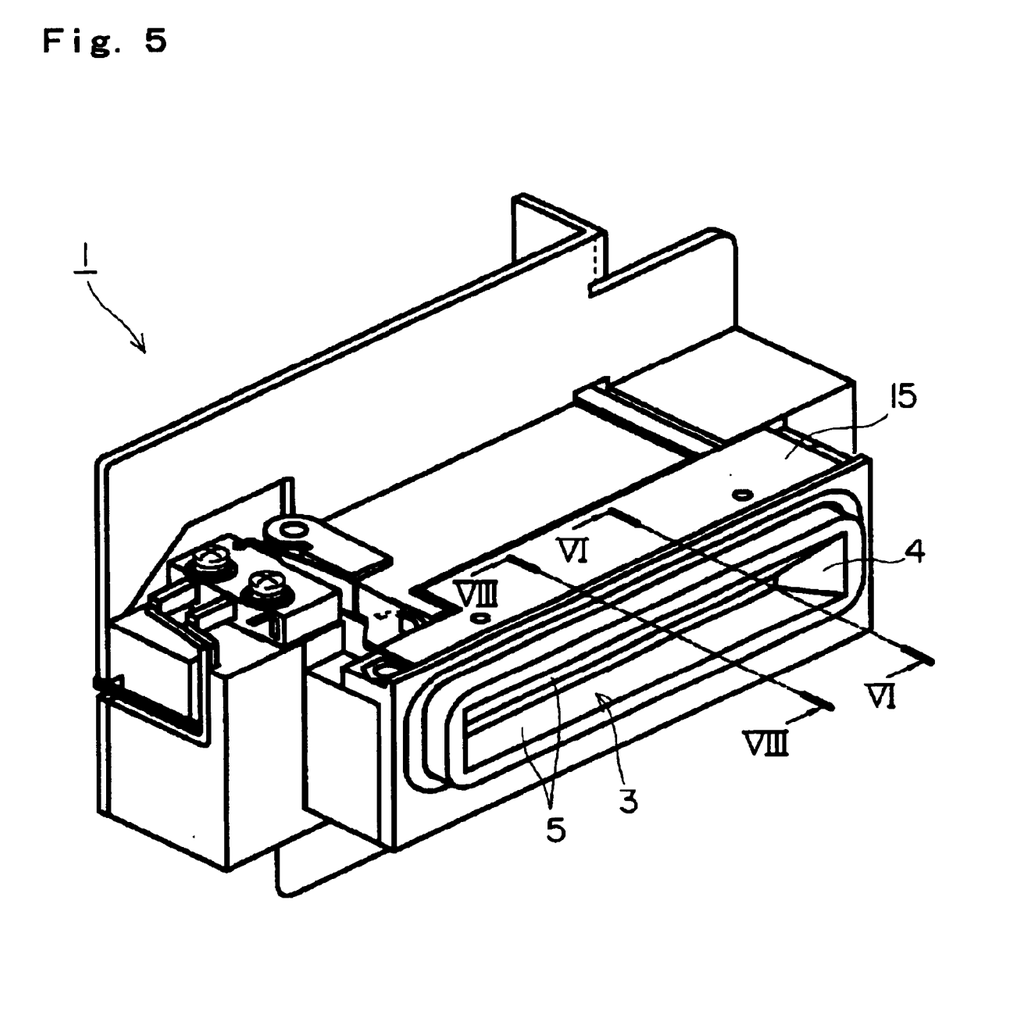
FIG. 5 is a perspective view showing the card gate mechanism according to another embodiment.
Figure 6:
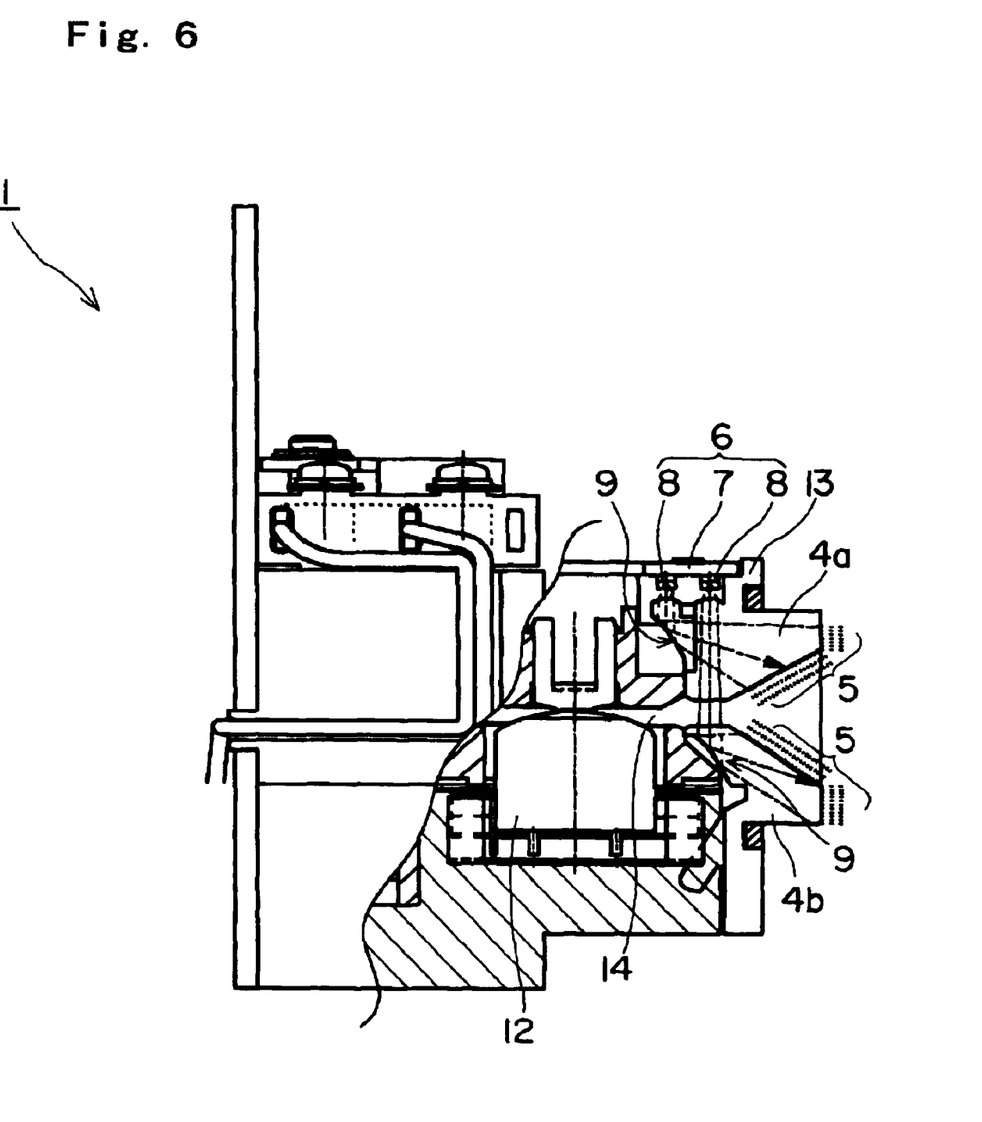
FIG. 6 is a side view of the card gate mechanism according to another embodiment, showing a partially cut surface taken along the line VI—VI in FIG. 5.

Further, the above has described the light source portion 6 having the light emission sources (LED) 8 arranged in a line on the circuit board 7 in the foregoing embodiment, the light emission sources 8 may be mounted in two lines so that the upper wide-open portion 5 is irradiated with the light from the light emission sources 8 on one side and the lower wide-open portion 5 is irradiated with the light from the light emission sources 8 on the other side as shown in FIGS. 5 and 6, for example. As shown in the drawing, when the light emission sources 8 are provided to the upper part of the upper frame 4a, the light with which the lower wide-open portion 5 is irradiated is transmitted through the upper frame 4a, then reflected by the lens portion 9 of the lower frame 4b, and reaches the lower wide-open portion 5.

Figure 7:
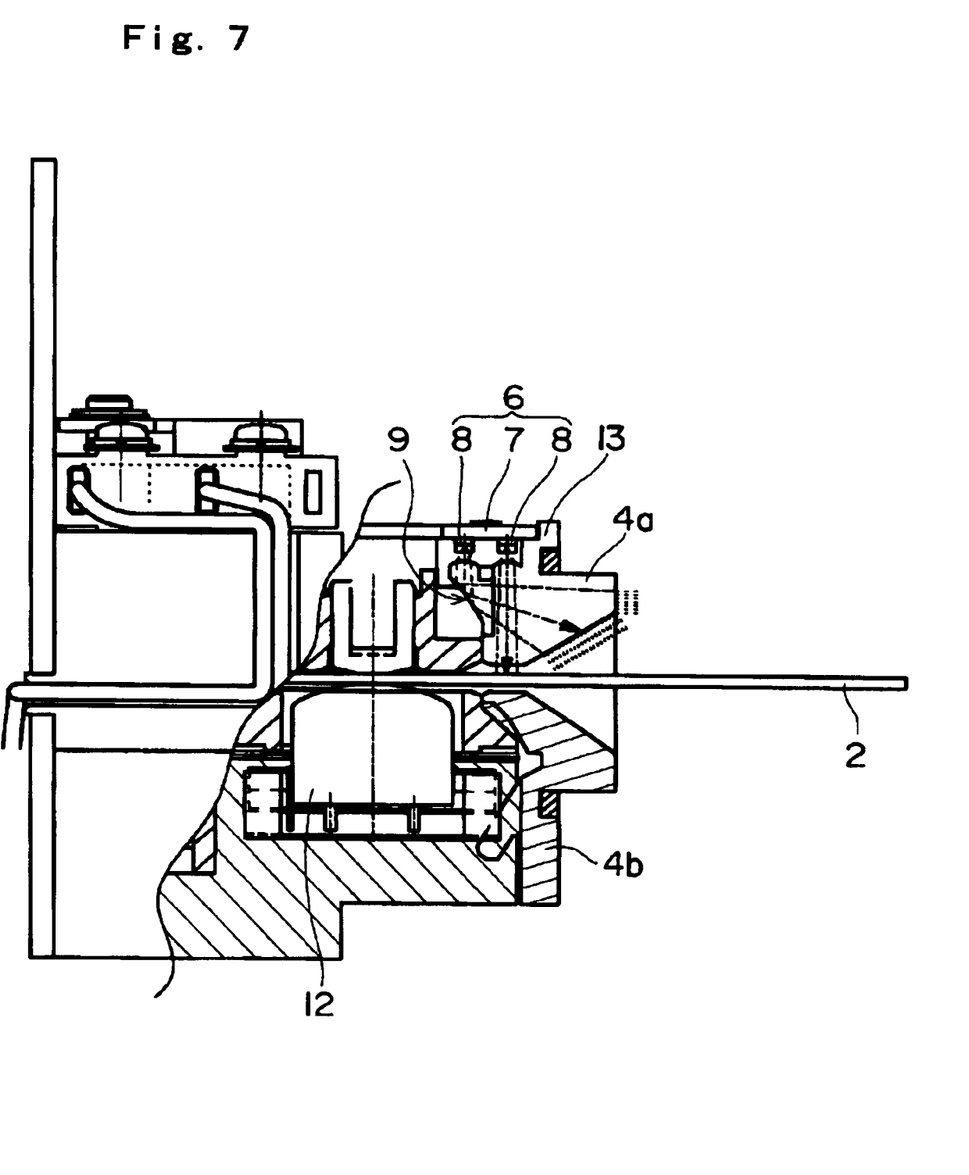
FIG. 7 is a side view showing a state when a card is inserted into the card gate mechanism illustrated in FIG. 6.
Figure 8:
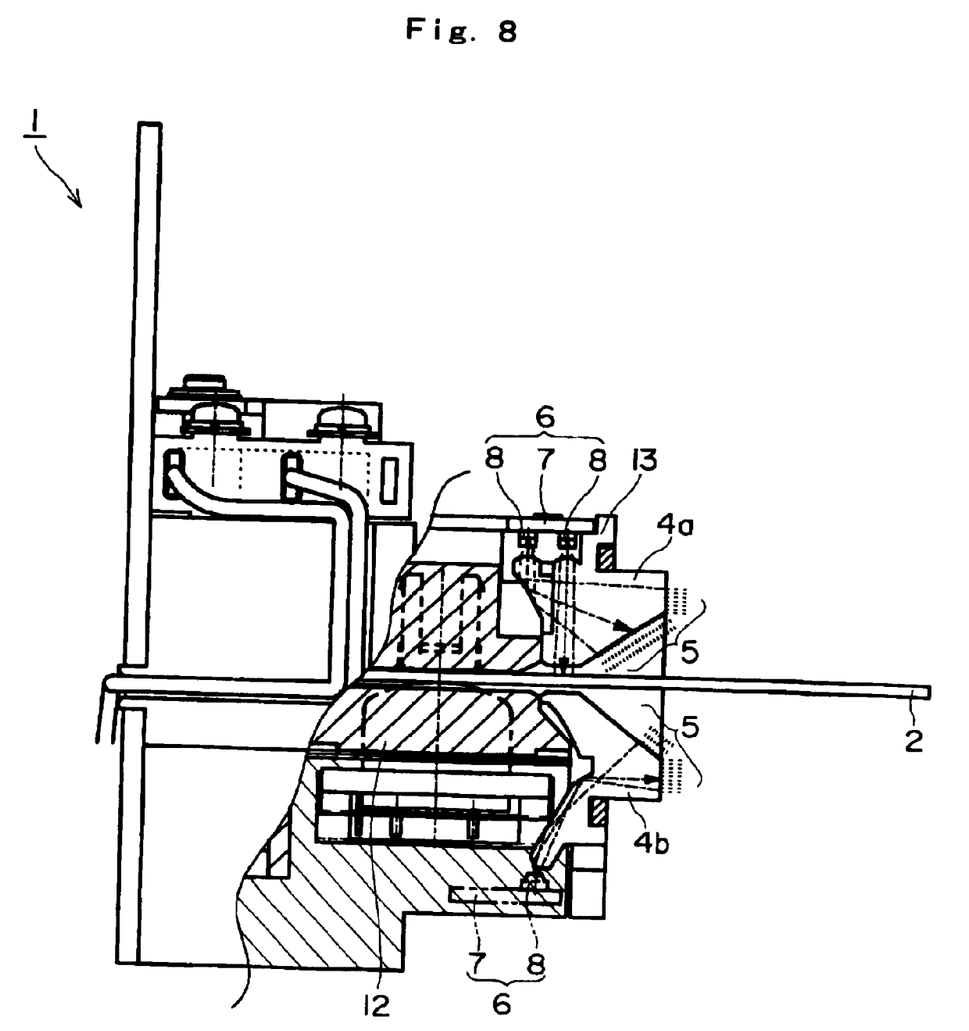
FIG. 8 is a side view showing a partially cut surface of the card gate mechanism having light source portions arranged on both upper and lower sides of a gate frame taken along the line VIII—VIII in FIG. 5.

In case of FIG. 6, however, when the card 2 is inserted, the light is prevented and the lower wide-open portion 5 of the gate opening 3 is not caused to shine as shown in FIG. 7. It is, therefore, also preferable to arrange the light source portions 6 on both upper and lower sides as shown in FIG. 8. In this case, both of the upper and lower wide-open portions 5 can be always caused to shine irrespective of existence of the card 2 in the gate opening 3.

Furthermore, although the LED is cited as a concrete example of the light source portion 6 in the above-described embodiment, a fluorescent tube may be arranged inside, for example. In this case, when the optical element 10 has a convex lens shape contrary to this embodiment, the light can be condensed on the wide-open portion 5 without providing a slit or the like to the fluorescent tube. Moreover, a laser beam can be used as the light source portion 6.

In addition, although the slit 11 is provided in the vertical direction and the circuit board 7 is vertically inserted from the upper part of the slit 11 in the foregoing embodiment, the mounting conformation of the circuit board 7 is not restricted thereto. For example, the circuit board 7 may be horizontally mounted as shown in FIG. 4 and others. In this case, the slit 11 explained in connection with the foregoing embodiment does not have to be provided.

Additionally, although the above has described the conformation that the slit 11 is provided to the upper frame 4a in the foregoing embodiment, the slit 11 may be provided to the lower frame 4b, and the light source portion 6 may be mounted to the lower frame 4b.

Further, in the above embodiment, a plurality of the light emission sources 8 are aligned in one or more lines in the card width direction as shown in FIG. 2 or FIG. 3 so that the light can be transmitted through the gate frame 4 or the optical element 10. However, a plurality of the light emission sources 8 are not always necessary, and a single light emission source 8 may be used as shown in FIGS. 9 to 11B, for example. A card gate mechanism 1 shown in these drawings will now be described hereinafter.

Figure 9:
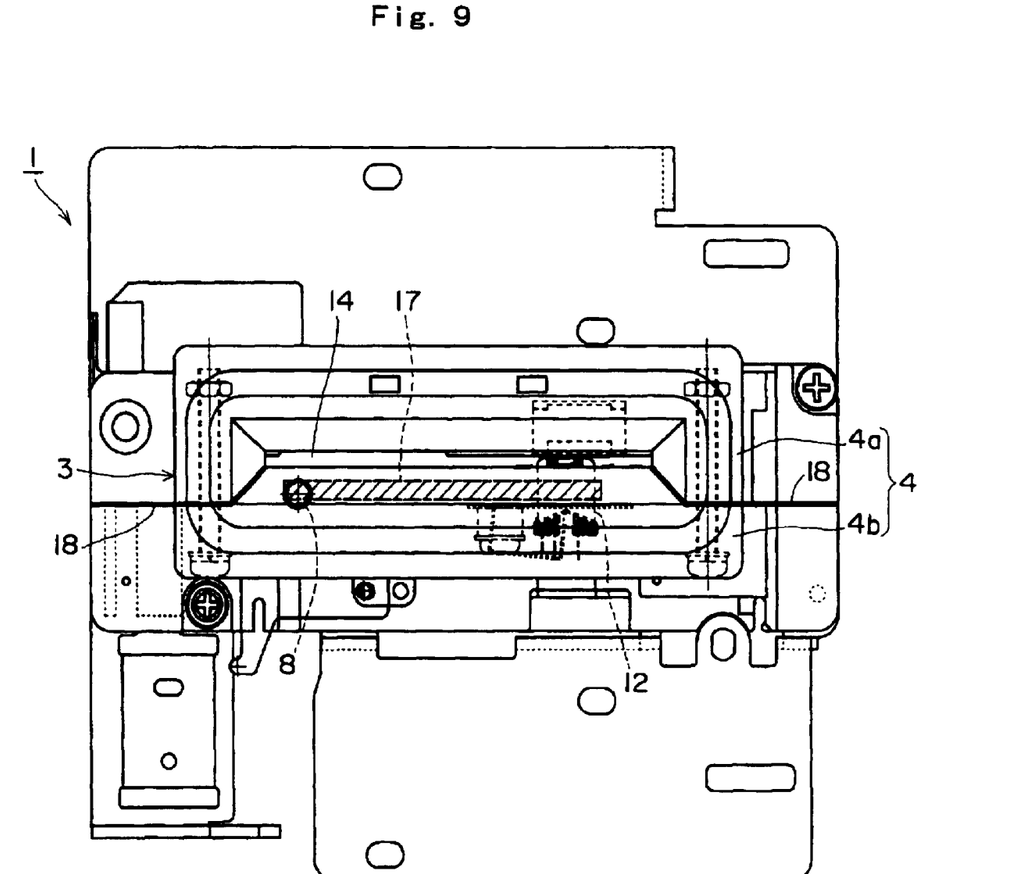
FIG. 9 is a front view showing the card gate mechanism which includes a light leading member and has a single light emission source.
Figure 10:
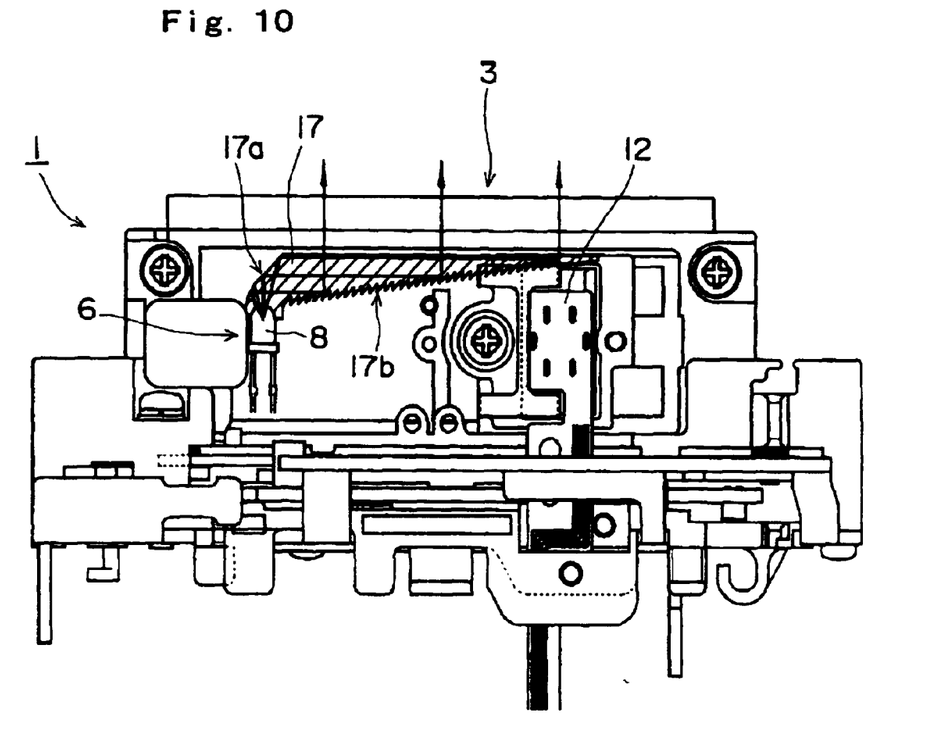
FIG. 10 is a bottom view of the card gate mechanism illustrated in FIG. 9.
Figure 11A:
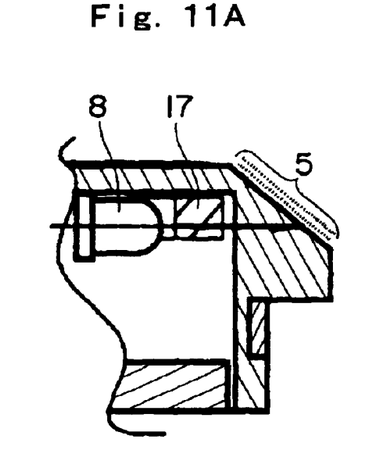
FIG. 11A is a partial view of a lower frame and others of the card gate mechanism in FIG. 9 showing from a side surface.
Figure 11B:
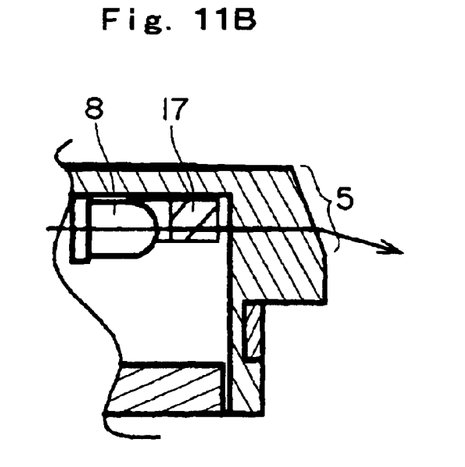
FIG. 11B is a view showing a case that an angle of a surface in a shining range is varied so as to transmit the light in the lower frame of the card gate mechanism illustrated in FIG. 11A.

As shown in the drawings, this card gate mechanism 1 includes a light source portion 6 consisting of a single light emission source 8, and a light leading member 17 which leads the light emitted by the light emission source 8. The light source portion 6 is provided to the opposite side to the magnetic head 12 in the card width direction. In the illustrated card gate mechanism 1, the light source portion 6 is arranged close to the left side relative to the magnetic head 12 which is close to the right side in the drawing. As shown in FIG. 10, the light leading member 17 is formed into a substantially triangular shape that its thickness in the card insertion direction is gradually reduced towards the magnetic head 12 side from the light source portion 6 side. Further, it includes a reflection portion 17a which is inclined so as to reflect the fetched light from the light emission sources 8, and a prism structure portion 17b formed at a part corresponding to a long side of the substantially triangular shape. It is to be noted that the hatching is given to the prism structure portion 17b in FIGS. 9 and 10 for better understanding. The prism structure portion 17b reflects in a wide range the light reflected by the reflection portion 17a so as not to cause irregularities in light. Therefore, at least an area of the wide-open portion 5 of the gate 3 to which the light leading member 17 is provided can be caused to shine. As shown in FIG. 11A, the surface in the shining area of the wide-open portion 5 is roughened by, e.g., embossment so that the light is transmitted therethrough, thereby shining. Furthermore, as shown in FIG. 11B, a larger value than a critical angle which causes no leakage of the light may be given to an angle to the surface in the shining range so that the light is transmitted without roughening the surface, thereby shining. In this example, the light leading member 17 is provided at only a part of the lower frame 4b as shown in FIG. 9 in order to transmit the light in this range. However, the light leading member 17 may have a larger width, thereby shining in a wider range. Alternatively, another light leading member 17 may be provided so that the upper frame 4a can be caused to shine at the same time.

According to the above-described card gate mechanism 1, since any part of the wide-open portion 5 can be caused to shine in a range where the light can be led by the light leading member 17 which leads the light, the part in which the light leading member 17 is arranged can be caused to evenly shine even if a single light emission source 8 is used. Therefore, the minimum number of the light emission source 8, i.e., one light emission source 8 can suffice, and the number of the components can be reduced, thereby reducing the size of the light source portion 6 as well as the size of the card gate mechanism 1.

Moreover, since the light leading member 17 whose thickness in the card insertion direction is gradually reduced towards the magnetic head 12 side is adopted, the applicable range to the card gate mechanism 1 is wide. For example, even if a gap between the magnetic head 12 and the wide-open portion 5 is small and the light source portion 6 is hard to be set between them, the wide-open portion 5 of the gate opening 3 can be caused to shine irrespective of existence of the magnetic head 12 as long as the light leading member 17 can be provided so as to get into the gap.

In addition, according to such a card gate mechanism 1, since it is easy to integrally constitute the upper frame 4a and the lower frame 4b forming the gate frame 4, a gap or a division surface can be readily prevented from being developed on the side part of the card carrying path 14. Specifically, when the upper frame 4a and the lower frame 4b are divided by, e.g., a division surface in bold indicated by reference numeral 18 in FIG. 9, the division line can be prevented from being developed inside the card carrying path 14, or only an edge part can be seen even if such a line is developed. In this case, it becomes hard to set a trap in the card carrying path 14, and a fraudulent act, e.g., fraudulently removing the card can be thereby advantageously prevented.

Additionally, in the card gate mechanism 1, since the light emission source 8 or the light leading member 17 is provided on only the lower frame 4b side, only the lower side of the gate opening 3 can shine. In this case, a user who utilizes the card reader can easily see the gate opening 3 from the top, and he/she is hardly bewildered thereby.

It is to be noted that the card gate mechanism 1 according to the foregoing embodiment is configured to have the light source portion 6 provided inside the gate frame 4 and emit the light to the outside of the gate frame 4, but "inside the gate frame 4" does not mean the inner side away from the outer hull of the gate frame 4 which is one constituent member. As apparent from each drawing, it rather means "in an inner area away from the gate frame 4 of the card gate mechanism 1 so as not to protrude to the outside of the card gate mechanism 1". That is, the light source portion 6 in this specification has a characteristic to emit at a position which is not an obstacle to the card gate mechanism 1 the light which passes through the gate frame 4, and it is good enough to arrange the light source portion 6 on the inner side away from the gate frame 4 so as to satisfy this characteristic.

It is to be noted that the foregoing embodiment is a preferred embodiment according to the present invention, but the present invention is not restricted thereto, and various modifications can be carried out without departing from the scope of the invention.

What is claimed is:

1. A card gate mechanism in a card reader being configured to insert a card from a gate opening of the card reader and take the card into the card reader by a card carrying mechanism provided inside the card reader, the card gate mechanism comprising:

a gate frame including a wide-open portion for leading the card to a card carrying path, the wide-open portion being formed of a material which transmits light therethrough and being provided on at least one surface side of the card to constitute the gate opening;

a light source portion being formed on the gate opening side away from a magnetic head used to detect insertion of the card and being provided with a plurality of light emission sources on a circuit board in a card width direction; and a lens portion being formed between the light emission sources and the wide-open portion and leading light emitted from the light source portion to the wide-open portion formed of the light transmission material, thereby causing the wide-open portion to shine by emitting light from the light source portion.

2. The card gate mechanism in a card reader according to claim 1, wherein an optical element used to diffuse the light is arranged between the light emission sources and the lens portion.

3. The card gate mechanism in a card reader according to claim 2, wherein the optical element has a Fresnel lens shape.

4. The card gate mechanism in a card reader according to claim 1, wherein the gate frame is constituted by upper and lower frames which are formed of the light transmission material, and a silt used to attach the circuit board of the light source portion in a direction orthogonal to a card insertion direction is formed to at least the upper frame.

5. The card gate mechanism in a card reader according to claim 1, wherein the circuit board including the light source portion being attached to an attachment portion provided to the upper frame which constitutes the gate frame.

6. The card gate mechanism in a card reader according to claim 1, wherein a light leading member for leading the light from the light source portion is provided to the wide-open portion.

7. The card gate mechanism in a card reader according to claim 6, wherein the magnetic head for detecting insertion of the card is provided close to one side of the gate frame in a card width direction, the light source portion is provided close to the opposite side to the magnetic head, and the light leading member is formed in such a manner that the light leading member's thickness in the card insertion direction is gradually reduced towards the magnetic head side from the light source portion side.

8. A card gate mechanism in a card reader being configured to insert a card from a gate opening of the card reader and take the card into the card reader by a card carrying mechanism provided inside the card reader, the card gate mechanism comprising:

a gate frame constituted by upper and lower frames formed of a material which transmits light therethrough, the gate opening and a card carrying path being constituted by the upper and lower frames therebetween formed of the light transmission material, and the gate frame including a wide-open portion for leading the card to the card carrying path;

a light source portion being formed on the gate opening side away from a magnetic head used to detect insertion of the card and being provided with a plurality of light emission sources on a circuit board in a card width direction; and a slit used to attach the circuit board in a direction orthogonal to a card insertion direction being formed to the upper frame of the gate frame, thereby causing the wide-open portion to shine by emitting light from the light source portion; and wherein a lens portion is formed to lead light emitted from the light emission sources to the wide-opening portion formed of the light transmission material, and an optical element is provided between the light emission sources and the lens portion to diffuse light.

9. The card gate mechanism in a card reader according to claim 8, wherein an attachment portion used to attach the circuit board is provided to the upper frame, and the attachment portion is formed on the gate opening side away from a magnetic head used to detect insertion of the card.

10. The card gate mechanism in a card reader according to claim 8, wherein the optical element has a Fresnel lens shape.

11. The card gate mechanism in a card reader according to claim 8, wherein a light leading member for leading the light from the light source portion is provided to the wide-open portion.

12. The card gate mechanism in a card reader according to claim 11, wherein the magnetic head for detecting insertion of the card is provided close to one side of the gate frame in a card width direction, the light source portion is provided close to the opposite side to the magnetic head, and the light leading member is formed in such a manner that the light leading members thickness in the card insertion direction is gradually reduced towards the magnetic head side from the light source portion side.

* * * * *